June 30, 1964      W. L. ROOT      3,139,471
TORCH CUTTING GUIDE ATTACHMENT
Filed Dec. 6, 1960
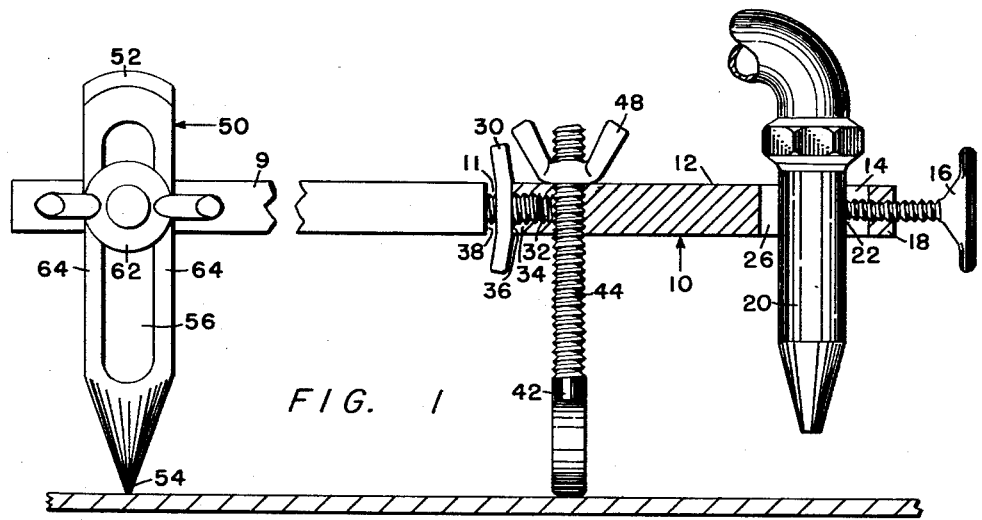
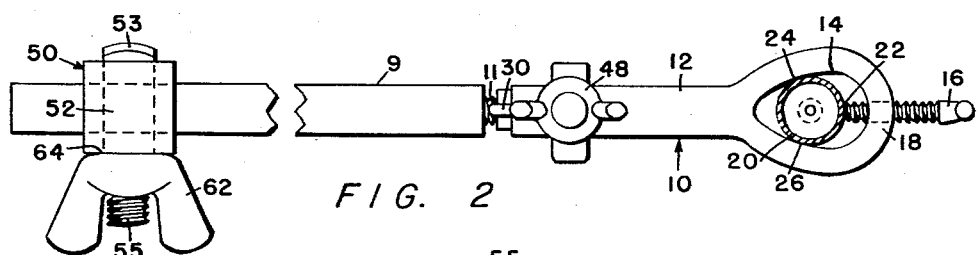
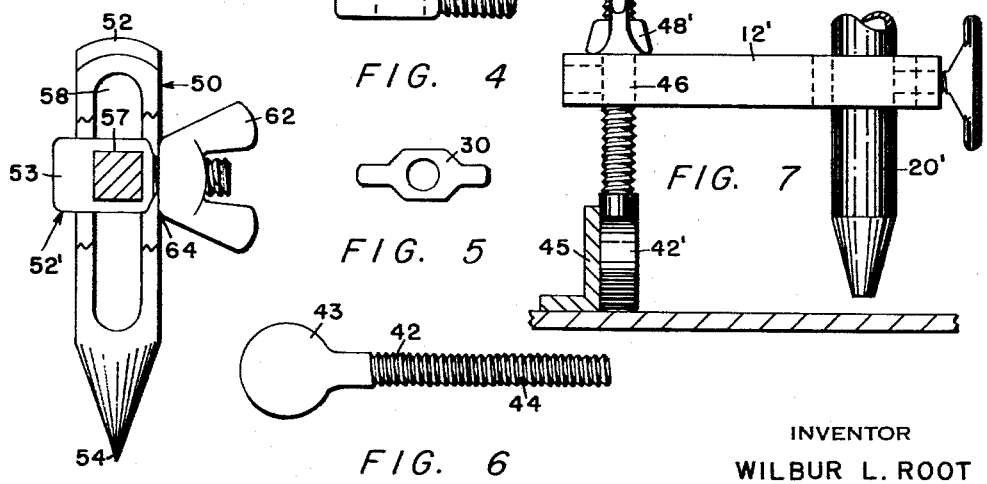
INVENTOR
WILBUR L. ROOT
BY *C. T. Cross*
ATTORNEY United States Patent Office 3,139,471
Patented June 30, 1964

3,139,471
TORCH CUTTING GUIDE ATTACHMENT
Wilbur L. Root, Rte. 3, Ashtabula, Ohio
Filed Dec. 6, 1960, Ser. No. 74,197
1 Claim. (Cl. 266—23)

This invention relates to a versatile guide attachment for cutting torches and more particularly relates to a simplified new and improved torch cutting guide and circle cutting attachment.

While various types of torch cutting guide and/or circle cutting devices have heretofore been proposed, most have involved relatively complex apparatus, have been difficult to use and/or have not adequately provided for supporting and guiding a cutting torch in the cutting of both circles and straight or other curved lines.

Hence, despite numerous prior proposals, none of the prior art devices has completely solved the varying problems encountered in the practical use of cutting torches where rapid, accurate torch cutting of straight or curved lines and circles of different diameters is necessary.

Accordingly, a principal object of this invention is the provision of a new and improved cutting torch adjustable attachment adapted to facilitate smooth and accurate torch cutting both of straight or irregular lines as well as circles of different radii without restricting arcuate movement of the torch even when cutting in a restricted area.

A further object of this invention is to provide a simple, readily vertically and horizontally adjustable cutting torch attachment adapted accurately to guide the torch in cutting without impairing its cutting action or movement.

A further object of this invention is the provision of an adjustable cutting torch attachment which permits accurate cutting of circles of different radii while easily maintaining a predetermined torch tip spacing from the surface to be cut at varying cutting torch angles.

A still further object of this invention is the provision of a cutting torch circle cutting guide facilitating preheating of the surface to be cut.

Other objects and advantages of this invention reside in the details of construction and operation as more fully hereinafter described and claimed, reference now being had to the accompanying drawing forming a part hereof wherein FIG. 1 is an elevational view particularly in section, and with parts broken away for clarity, illustrating a preferred embodiment of apparatus of this invention;

FIG. 2 is a plan view of the apparatus shown in FIG. 1 illustrating in more detail the manner of attachment to the burner torch tip;

FIG. 3 is an enlarged side elevational view, partially in section, and with parts broken away for clarity of the adjustable center post of this invention as shown in FIG. 1;

FIG. 4 is an enlarged plan view of the center post slidable lock element shown in FIGS. 1, 2 and 3;

FIG. 5 is a plan view of the lock nut shown in FIGS. 1 and 2;

FIG. 6 is an enlarged view of the adjustable guide element shown in FIGS. 1 and 2; and FIG. 7 illustrates in fragmentary form a preferred embodiment of apparatus of this invention mounted on a cutting torch tip used to guide a torch in cutting a straight or curved line.

Broadly the basic torch guide apparatus of this invention comprises, in combination, a laterally extending rigid guide arm terminating in means to attach the arm to a cutting torch tip, the arm having depending therefrom and adjustably engaged thereon intermediate its ends a rigid, integral guide element of uniform thickness adapted to maintain the torch a predetermined lateral distance from a guide surface and/or when desired to maintain a predetermined spacing of the torch tip from the surface to be cut.

In cutting circles the apparatus of this invention additionally embodies an adjustable center post surrounding a cross section of the arm and freely slidable vertically and horizontally and positionable at any position longitudinally along the arm from the torch engaging means to the opposite end.

Referring now more particularly to the drawing, there is shown on FIG. 1 apparatus of this invention comprising, in combination, an elongated arm indicated generally at 10 of a polygonal, preferably square or rectangular, cross section, e.g., ⅜" x ⅜" or ¼" x ¼" as shown in FIG. 3. The arm 10 comprises two sections joined end to end, i.e., a longer section 9, typically about 11 inches long, and a shorter section 12, typically about 3 inches long, provided at one end with a torch tip clamp comprising a torch tip surrounding and receiving generally drop-shaped opening 14 outwardly increasing in size toward the end of the arm and provided with a clamp screw 16 extending through and threadedly engaging the end portion of the outer rim 18 of the clamp opening 14 whereby a torch tip 20 can be rigidly engaged and secured within the opening 14 via three point contact of the end 22 of the clamp screw 16 and two points on the inner surfaces 24 and 26 of the opening. Thus, it will be appreciated that because of the drop-shaped diverging or curved V-type inner surfaces 24 and 26 of the clamp opening, it is possible to accommodate torch tips of differing sizes and/or engage the tips at different points along their length simply by adjusting the clamp screw 16.

The longer arm section 9 is provided with a threaded opening at one end and at the other end with threaded extension 11, typically ⁷⁄₁₆" long, adapted to have threadedly engaged thereon a curved lock nut 30 and threadedly to engage a corresponding threaded opening 32 in the end 34 shorter arm section 12.

It will be understood that the two arm sections 9 and 12 can be disengaged, and the shorter arm section used alone where small radius circles or other curved or straight lines are to be cut or alternatively, the two sections can be joined as shown and locked in any desired position with respect to each other by tightening lock nut 30 against the end surface 36 of the shorter section. It also will be appreciated that the threaded extension 11 could, if desired, extend from the shorter arm and threadedly engage a corresponding threaded opening in the longer arm section whereby the lock nut 30 could be tightened against the end surface 38 of the longer arm section to lock the two arm sections into a rigid elongated arm. An advantage of this construction is that while in most instances the two arm sections will be positioned to provide a functionally uninterrupted polygonal cross section, when desired, the shorter section carrying the torch tip can be rotated or oscillated and locked at any desired angle with respect to the longer arm section.

Adjustably engaged in the generally laterally-disposed shorter arm section intermediate its ends is a depending, rigid arcuate-bottomed (comprising substantially an entire circumference of a circle, e.g., typically of ¾" diameter) guide element, typically about 2⅞" long terminating at its opposite end in an outstanding threaded shaft 44 adapted threadedly to engage and project through an opening 46 in the shorter arm section, the threaded shaft carrying a wing nut 48 serving to lock the guide element in any desired position with respect to the shorter section of the arm and the torch tip, i.e., with the flat surface 43 parallel to the line of cut or at any desired angular relationship thereto. It will be understood, of course, that the wing nut 48 can be replaced with any equivalent lock means, e.g., a hexagonal or other shaped nut.

Mounted on the arm, generally but not necessarily on the longer section, is a center post, conveniently about 3⅜" long x ⅝" x ⅝", indicated generally at 50. This center post comprises a body portion preferably although not necessarily of square or rectangular cross section terminating at one end in a smooth, convex curved surface 52 easily fitting the hand and at the opposite end in a point 54 readily engaging the surface to be cut or a center-locating indentation in the surface to be cut. Intermediate the ends of the center post 50 are provided longitudinally extending slots 56 and 58 typically about two inches long, intersecting at right angles which slots, in combination, define longitudinally-extending openings in which the arm is slidably received in slot 58 via a slidable lock element 52' terminating at one end in a projection 53 of thickness corresponding to the width of opening 56 but slidable therein and at the opposite end in a threaded shaft 55 and having intermediate its ends a polygonally-shaped opening 57 corresponding to the cross section of the arm but slidable thereon, the lock element 52' surrounding the polygonal cross section of the arm and itself being slidable perpendicularly with respect to the center line of the arm within slot 56, whereby the center post 50 may be positioned at any desired point along the length arm, including the joint between the two arm sections, the length of center post depending from the arm adjusted and the center post locked in the desired alignment by means of a wing nut 62 tightened against the outer surface edges 64 of the center post.

In operation, the apparatus of this invention advantageously may be used in two different ways. The shorter arm section may be used alone as a guide attachment for cutting straight or curved lines. For example, as shown in FIG. 7, with primed numbers referring to like portions of the apparatus of FIGS. 1-6, a torch tip 20' may accurately be guided in making straight cuts via a guide element 42' depending from an arm section 12' moved along a straight or curved edge 45. Alternatively, angle iron sections, pipe or other curved sections can be cut in the same manner.

In this embodiment of the invention, the guide element 42' is vertically adjustable via wing nut 48' to vary the distance the torch tip is maintained from the surface to be cut in the same manner as the corresponding unprimed numbered elements previously described.

It will be appreciated that the apparatus of this invention permits easy control of torch cutting since the torch tip always is unobstructed and in full view of the operator whereby it can easily cut a straight line or circle even on or from small pieces of metal or in close quarters. Since guides 42 and 42' are of a circular shape the torch supported thereby can be turned or rolled to any angle without changing the distance of the torch tip from the surface to be cut. Further, since the guide element is of uniform thickness throughout its height, any variation in the height of the point of contact between the guide element and the straight or curved edge followed by the guide element does not result in an inaccurate cut.

In cutting circles of small diameter, the guide element 42 and/or 42' can be removed and the center post 50 positioned, if desired, at the connection of the two arm sections. If a circle of a smaller radius is to be cut, the center post 50 can be positioned solely on the shorter arm section 12 or 12' and the longer arm section disengaged if desired. In such event, the center post can be visualized as replacing the guide 42' in FIG. 7 or positioned between the guide 42' and the torch tip 20', depending on the radius desired.

Torch cutting with apparatus of this invention is effected simply and accurately, in the case of cutting straight lines, pipe and angle iron by moving the guide element 42 or 42' along a convenient straight edge or other pattern or template, e.g., an angle iron 45. It will be appreciated that cutting is simplified since it is easy to see the torch flame in cutting and since the guide element 42 (and 42') is round on the bottom so that the torch tip can be turned to any desired angle while maintaining a predetermined spacing from the surface to be cut. Further, since the guide is smooth and integral in nature, surface imperfections such as rust, scale, pits or the like are not likely to cause an inadvertent, unexpected disadvantageous torch movement. In addition, it will be appreciated that by providing the guide element 42 longitudinally inside of the torch tip, the torch can be tipped to place the tip closer to the surface to be cut when faster initial heating of the surface is desired. It also will be observed that this construction makes it possible to cut to the edge of the work surface, thus minimizing waste material.

In the cutting of circles which is accomplished simply by moving the cutting torch through the arc defined by the length of arm desired, it will be noted that the radius is dictated solely by the length of the arm as adjusted to suit the size of circle to be cut since no radius blind spot exists at the connection of the two arm sections. Further, the apparatus of this invention is easily adjusted in operation, i.e., the guide 42 (or 42') and center post 50 are each locked in position by a single nut which in the case of the center post simultaneously locks against movement in any direction and maintains a perpendicular relationship of arm and center post even when cutting on a slanted surface. A still further advantage of apparatus of this invention is that while the dimensions of the various elements can be varied, an extremely useful embodiment can be made in so-called "pocket size" easily attached to varying sized torch tips on either side, at any angle on the circumference of the cutting head, whereby the guide element can be positioned on either side for left or right hand use or out of the line of vision. By twisting the shorter arm section with respect to the longer arm section the cutting of light stock is facilitated since the flame can easily be positioned at an angle with respect thereto.

The foregoing is considered as illustrative only of the principles of the invention. Further, while this specification sets forth in detail the present and preferred construction of the apparatus of this invention, generally fabricated from tool steel, bar stock or the like, still in practice deviations from such detail may be resorted to as do not form a departure from the spirit of the invention, as defined by the appended claim.

Having thus described the invention, the following is claimed as new and useful, and upon which Letters Patent are desired:

A torch cutting guide comprising, in combination, an elongated rigid arm having at least two arm sections twistably joined in threaded end-to-end engagement with a lock nut therebetween to permit locking of said sections together; a rigid torch clamp at the end of said arm, said clamp having a torch tip receiving opening, said opening embodying diverging inner surfaces and at the outer end thereof having a clamp screw threaded through the clamp wall and projecting along the axis of said arm, thereby, in combination, to define a torch tip centering, rigid, three point contact against the periphery of a torch tip disposed within said clamp, a center post engaged on said arm and adjustably positionable along, and perpendicularly with respect to, said arm for substantially its entire length, said center post being rigidly secured in a desired position by a single lock nut; and a rigid, curved bottom, torch guide element disposed between the said center post and said torch clamp and threaded through the arm section containing the said torch clamp at its end, said guide element being lockable in a desired position by a single lock nut.

References Cited in the file of this patent

UNITED STATES PATENTS

| | | |
|---|---|---|
| 1,139,048 | Messer | May 11, 1915 |
| 1,294,294 | Martin | Feb. 1, 1919 |
| 2,036,734 | Kehl | Apr. 7, 1936 |
| 2,323,298 | Cook | July 6, 1943 |
| 2,745,181 | Czerniewicz | May 15, 1956 |
| 2,747,856 | Burdwood | May 29, 1956 |
| 2,852,245 | Lamb | Sept. 16, 1958 |

OTHER REFERENCES

How to Increase Efficiency in Hand Cutting Operations, by The Linde Air Products Company, New York, N.Y., 1922, pages 14, 15, 16, 17, 18 and 19.